US011566928B2

(12) United States Patent
Liu et al.

(10) Patent No.: US 11,566,928 B2
(45) Date of Patent: Jan. 31, 2023

(54) ULTRASONIC FLOW METER HAVING FOUR SEPARATE TRANSDUCER ASSEMBLIES MOUNTED WITHIN MOUNTS IN A FLOW CELL

(71) Applicant: Spire Metering Technology LLC, Marlborough, MA (US)

(72) Inventors: Tianshui Liu, Canton, MA (US); Murad Laribi, Chelsea, MA (US); Chang Shen, Acton, MA (US)

(73) Assignee: SPIRE METERING TECHNOLOGY LLC, Marlborough, MA (US)

( * ) Notice: Subject to any disclaimer, the term of this patent is extended or adjusted under 35 U.S.C. 154(b) by 290 days.

(21) Appl. No.: 16/994,562

(22) Filed: Aug. 15, 2020

(65) Prior Publication Data

US 2021/0048325 A1 Feb. 18, 2021

Related U.S. Application Data

(60) Provisional application No. 62/887,293, filed on Aug. 15, 2019.

(51) Int. Cl.
 G01F 1/66 (2022.01)
(52) U.S. Cl.
 CPC .................................. G01F 1/662 (2013.01)
(58) Field of Classification Search
 None
 See application file for complete search history.

(56) References Cited

U.S. PATENT DOCUMENTS

| 7,823,463 | B1* | 11/2010 | Feller | G01F 1/667 |
| | | | | 73/861.27 |
| 7,870,793 | B1* | 1/2011 | Feller | G01F 1/662 |
| | | | | 73/861.27 |
| 8,621,936 | B2* | 1/2014 | McDonald | G01F 1/662 |
| | | | | 73/861.18 |
| 10,557,733 | B2* | 2/2020 | Fang | G01F 1/667 |
| 10,809,106 | B2* | 10/2020 | Stuyvenberg | G01F 15/18 |
| 11,131,572 | B2* | 9/2021 | Augenstein | G01F 1/667 |
| 2006/0059999 | A1* | 3/2006 | Feller | G01F 1/66 |
| | | | | 73/861.27 |
| 2015/0107370 | A1* | 4/2015 | Bezdek | G01F 25/10 |
| | | | | 73/861.27 |
| 2020/0149940 | A1* | 5/2020 | Shen | G01F 1/668 |
| 2021/0025743 | A1* | 1/2021 | Welsch | G01N 29/024 |

* cited by examiner

*Primary Examiner* — Harshad R Patel
(74) *Attorney, Agent, or Firm* — Kriegsman & Kriegsman

(57) ABSTRACT

A flow meter for calculating fluid flow rate and/or volume includes a flow cell shaped to define an internal passageway through which the fluid travels, and four separate transducer assemblies independently mounted within mounts in the flow cell in fluid communication with the internal passageway. Each transducer assembly includes a transducer, a transducer stud with a recess in its front surface that is dimensioned to receive the transducer, and a sensor plate mounted onto the stud for retaining the transducer in the recess. A bore extends vertically through the transducer stud and into communication with the recess, the bore being dimensioned to receive wiring for the transducer. The separation and independent mounting of the four transducer assemblies in the flow cell minimizes the disruption of normal fluid flow through the internal passageway, thereby enabling greater accuracy of measurements to be achieved.

10 Claims, 7 Drawing Sheets

ULTRASONIC FLOW METER HAVING FOUR SEPARATE TRANSDUCER ASSEMBLIES MOUNTED WITHIN MOUNTS IN A FLOW CELL

CROSS-REFERENCE TO RELATED APPLICATIONS

The present application claims the benefit under 35 U.S.C. 119(e) to U.S. Provisional Patent Application No. 62/887,293, which was filed on Aug. 15, 2019 in the names of Walter Liu et al., the disclosure of which is incorporated herein by reference.

FIELD OF THE INVENTION

The present invention relates generally to fluid measurement devices and, more particularly, ultrasonic flow meters.

BACKGROUND OF THE INVENTION

A flow meter is a fluid measurement device that measures the velocity of fluid traveling through a designated flow tube, or conduit, in order to calculate total volume flow. In this manner, a flow meter can determine the total volume of fluid used in a particular environment. For this reason, flow meters are commonly utilized in both public and private water systems to measure water consumption.

An ultrasonic flow meter is one type of flow meter that relies upon the transmission and measurement of ultrasonic waves within the designated conduit in order to accurately calculate fluid flow rate and/or volume. An ultrasonic flow meter typically comprises a flow cell with a tubular main body which defines the interior channel through which the designated fluid travels.

In one type of flow meter which is well known in the art, a first transducer assembly is mounted within an externally-accessible, vertical support, or mount, formed along one exterior side of the main body towards its inlet port. Similarly, a second transducer assembly is mounted within an externally-accessible, vertical support, or mount, formed along the opposing exterior side of the main body towards its outlet port. Each transducer support is in fluid communication with the interior channel, thereby providing the first and second transducer assemblies with the capability to measure fluid velocity, as will be explained further below.

Each of the first and second transducer assemblies is constructed as an elongated cylindrical member which is inserted downward into an open-top bore defined by its corresponding support mount. More specifically, each transducer assembly typically includes an elongated, cylindrical post on which a pair of transducers are mounted in vertical alignment. As can be appreciated, the pair of transducers is mounted on the single-piece post such that, with the flow meter assembled, one transducer is positioned towards the top of the interior channel and the other transducer positioned towards the bottom of the interior channel.

In use, the upper and lower pair of transducers in the first transducer assembly transmits ultrasonic sound waves through fluid traveling within the flow tube. The ultrasonic sound waves are received by the upper and lower pair of transducers in the second transducer assembly. The pair of transducers in the second transducer assembly then transmit ultrasonic sound waves back to the pair of transducers in the first transducer assembly to complete the sound wave travel path, or cycle. The sound wave data is then compiled and processed by an integrator in electrical communication with the transducers in order to calculate fluid flow rate and/or volume.

Although well known in the art, it has been found that flow meters of the type as described above suffer from a notable shortcoming. Specifically, the integration of single-piece, post-type, transducer assemblies into the flow cell compromises the overall effectiveness of the flow meter. Most notably, the significant length and diameter of the post which supports the pair of transducers creates an inwardly-extending, vertical protrusion along one side of the internal passageway. Further, since the first and second transducer assemblies are mounted on opposite sides of the flow cell, the pair of transducer assemblies together create substantial protuberances along both sides of the internal passageway. Due to its considerable size, each post disrupts normal fluid flow within the internal passageway and creates turbulence, thereby directly affecting the accuracy of fluid flow rate and volume calculations.

SUMMARY OF THE INVENTION

It is an object of the present invention to provide a new and improved flow meter for measuring the flow rate and/or volume of fluid delivered therethrough.

It is another object of the present invention to provide a new and improved flow meter as described above which utilizes multiple pairs of transducer assemblies to transmit and receive sound waves through the fluid in order to calculate fluid flow rate and/or volume.

It is yet another object of the present invention to provide a flow meter as described above which is constructed to minimize the disruption of normal fluid flow therethrough.

It is still another object of the present invention to provide a flow meter as described above that has a limited number of parts, is inexpensive to construct, and is highly accurate in calculating fluid flow rate and/or volume.

Accordingly, as one feature of the present invention, there is provided a flow meter, comprising (a) a flow cell shaped to define an internal passageway, and (b) at least four separate transducer assemblies independently mounted within the flow cell in fluid communication with the internal passageway.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Ultrasonic Flow Meter 11

Figure 1A:
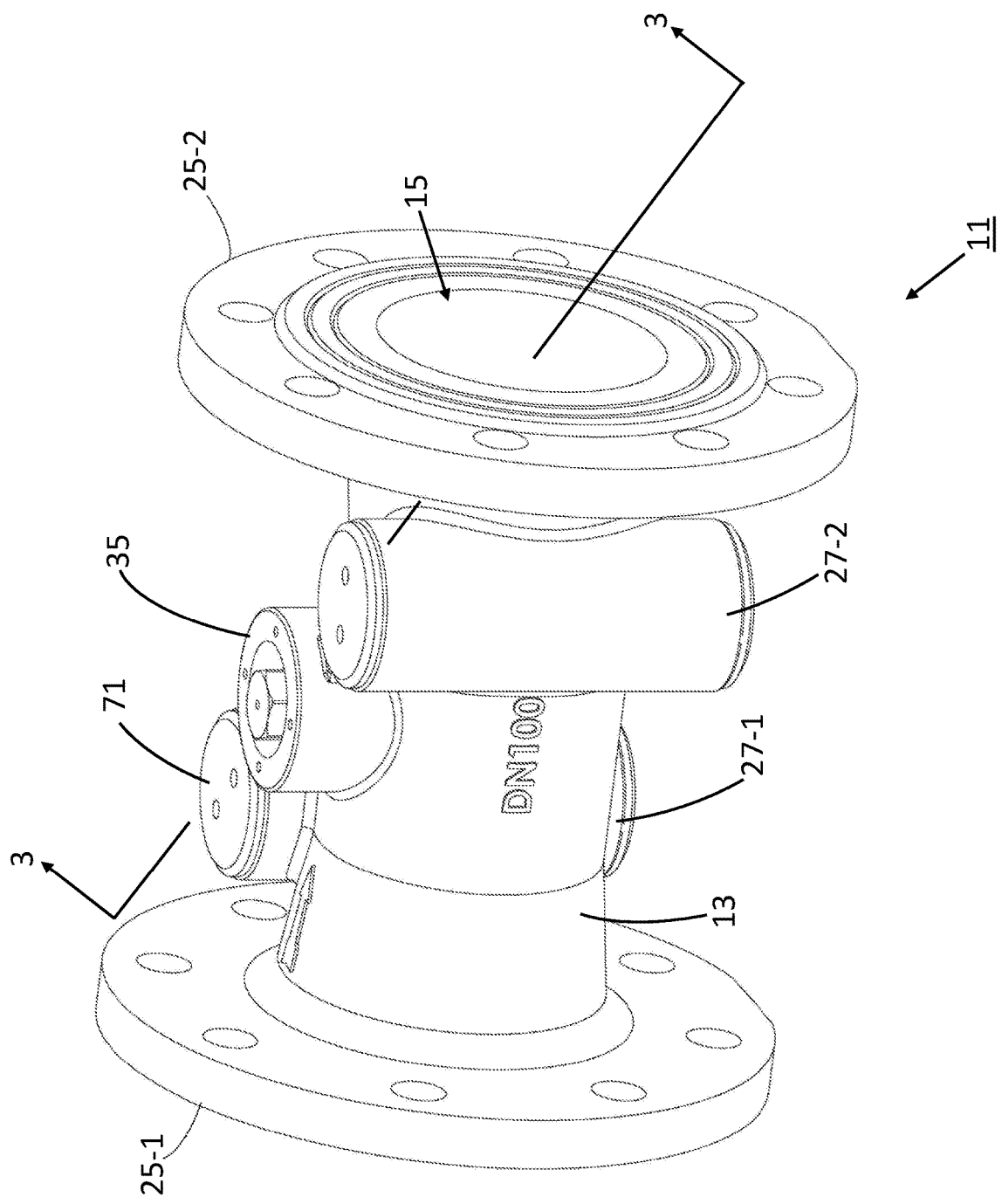
FIGS. 1(a)-(c) are front perspective, front, and left end views, respectively, of an ultrasonic flow meter constructed according to the teachings of the present invention, the ultrasonic flow meter being shown without an integrator for ease of illustration.
Figure 1B:
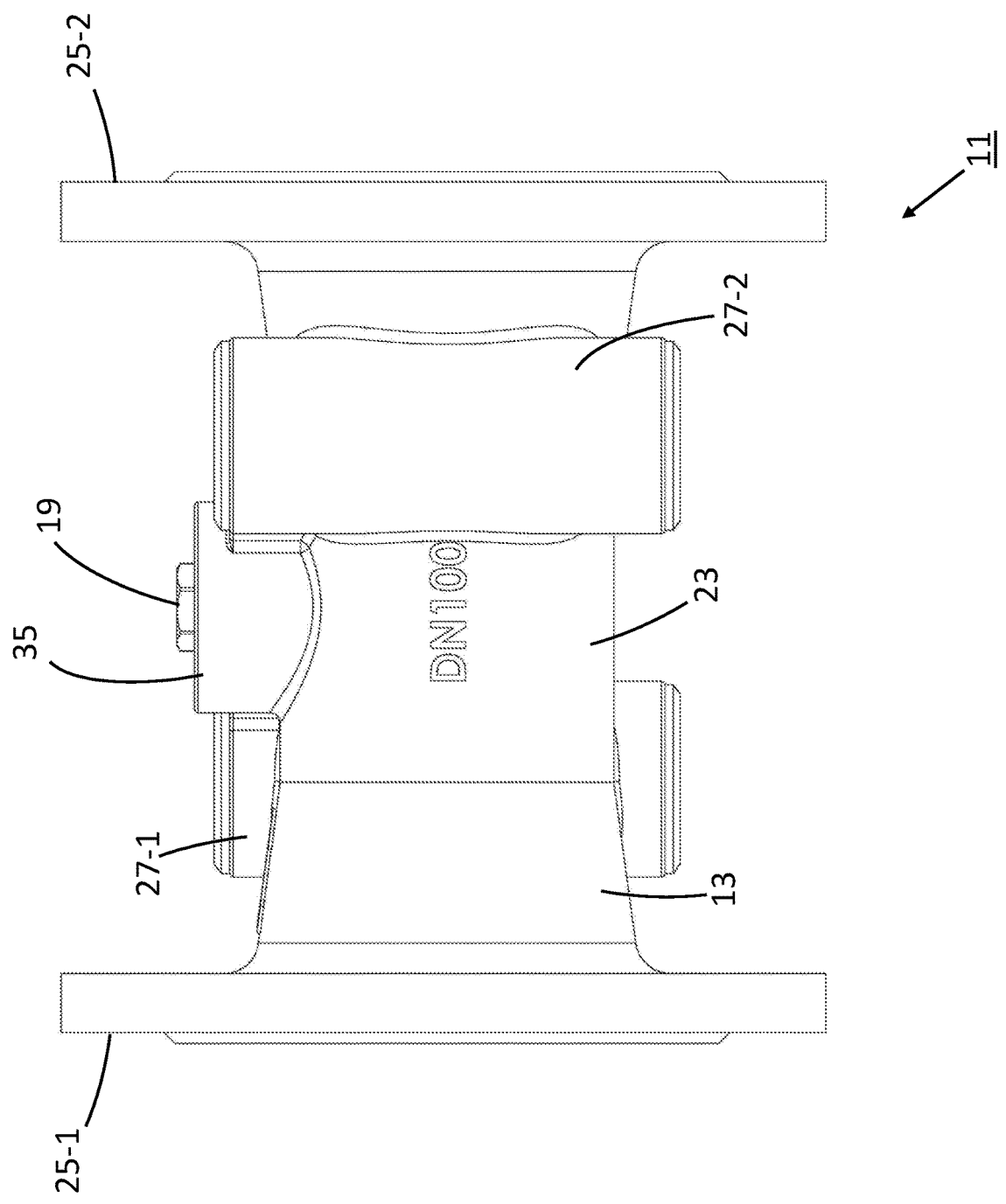

Referring now to FIGS. 1(a), 1(b), 1(c), 2, and 3, there is shown an ultrasonic flow meter constructed according to the teachings of the present invention, the flow meter being identified generally by reference numeral 11. As will be explained further below, flow meter 11 is designed with uniquely constructed and configured transducer assemblies which, in its properly assembled state, minimize disruption of fluid flow and therefore enable the calculation of fluid flow rate with a high degree of accuracy.

In the description that follows, ultrasonic flow meter 11 is described primarily in connection with the measurement of the flow rate and/or volume of water delivered therethrough. However, it is to be understood that flow meter 11 is not limited for use with water, but rather could be utilized with other types of fluids without departing from the spirit of the present invention.

Ultrasonic flow meter 11 comprises (i) a unitary flow cell 13 shaped to define a substantially enclosed, internal passageway 15 through which water travels, (ii) four separate transducer assemblies 17-1 thru 17-4 which are independently mounted within flow cell 13 in fluid communication with internal passageway 15, (iii) a pressure sensor 19 mounted within flow cell 13 for measuring pressure levels within internal passageway 15, and (iv) a temperature sensor 21 mounted within flow cell 13 for measuring the temperature within flow cell 13. As will be described further below, the utilization of four separate transducer assemblies 17 in flow meter 11 minimizes the degree of fluid flow disruption, which is a principal object of the present invention.

Although not shown herein for simplicity and ease of illustration, ultrasonic flow meter 11 additionally comprises an integrator in electrical communication with transducer assemblies 17, pressure sensor 19, and temperature sensor 21. In use, the integrator compiles and processes data from transducer assemblies 17, pressure sensor 19, and temperature sensor 21 in order to calculate fluid flow rate and/or volume.

Flow cell 13 is a unitary member constructed of a rigid and durable material, such as metal. Flow cell 13 is shaped to include an elongated, tubular main body 23 and a pair of enlarged, ring-type flanges 25-1 and 25-2 formed at opposite ends of main body 23. Together, main body 23 and flanges 25 define internal passageway 15 through which water travels, with flange 25-1 providing the entrance port for passageway 15 and flange 25-2 providing the exit port for passageway 15.

A pair of hollow, cylindrical, vertically-extending, transducer assembly supports, or mounts, 27-1 and 27-2 are formed along opposing exterior sides of main body 23, with mount 27-1 situated proximate inlet flange 25-1 and mount 27-2 situated proximate outlet flange 25-2. As seen most clearly in FIG. 3, each cylindrical support 27 defines a longitudinal bore 29 with an open top end 29-1 and an open bottom end 29-2. As can be seen, an inner portion of bore 29 is in fluid communication with internal passageway 15, thereby enabling transducer assemblies 17 mounted within supports 27 with the capability to measure fluid velocity.

Each of open top and bottom ends 29-1 and 29-2 is counterbored so as to create an internal shelf, or rim, 31. As will be explained further below, each shelf 31 serves as a mounting surface on which a corresponding transducer assembly 17 can be fixedly secured. Additionally, each of open top and bottom ends 29-1 and 29-2 is provided with an internal threading 33 which releasably receives a cap for selectively enclosing bore 29.

Figure 3:
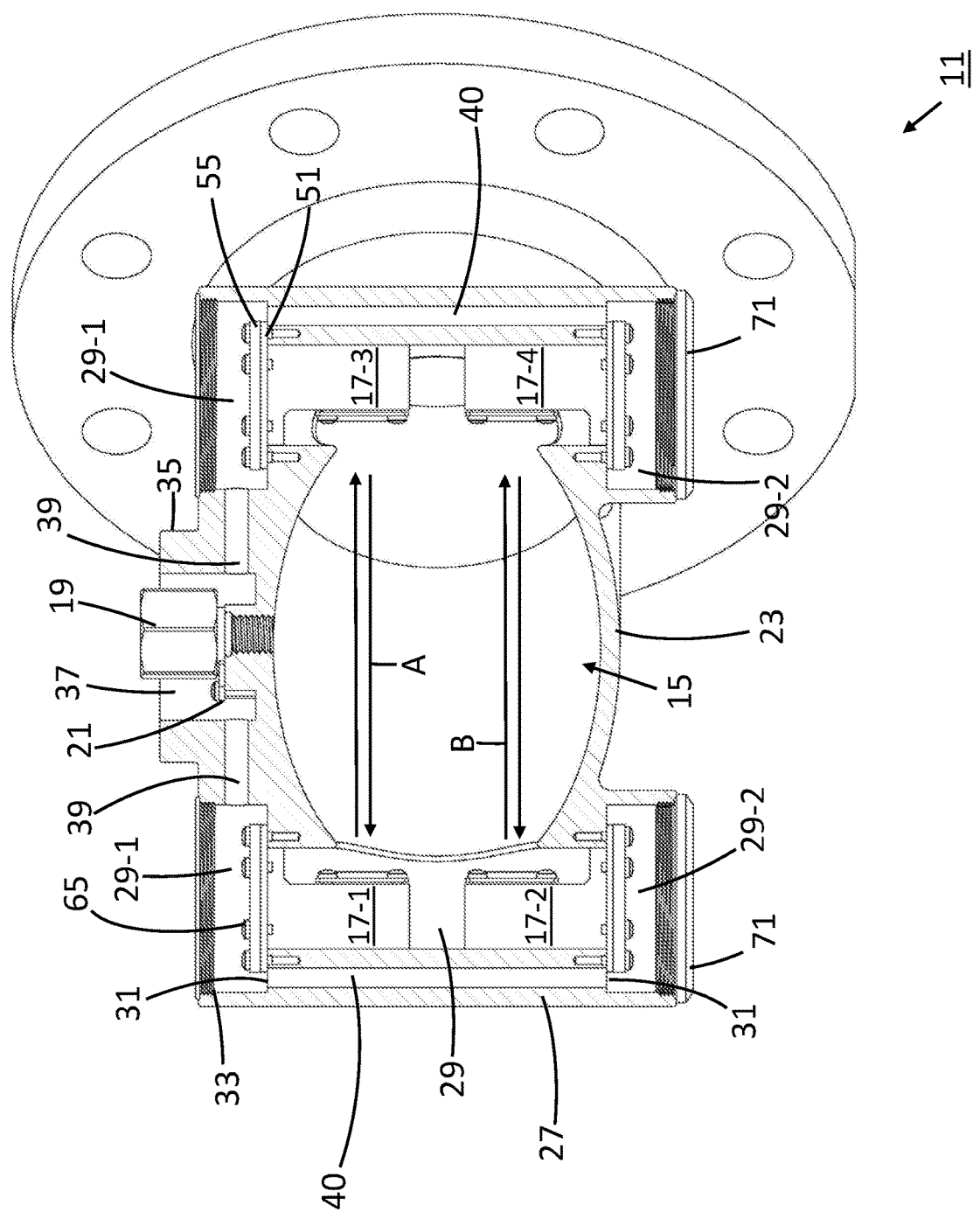
FIG. 3 is a section view of the ultrasonic flow meter shown in FIG. 1(a), taken along lines 3-3.
Figure 4A:
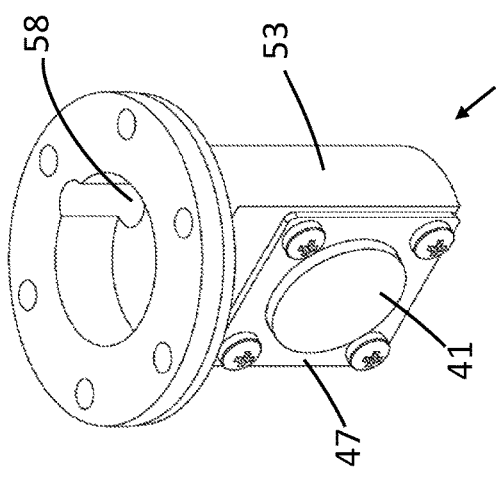
FIGS. 4(a)-(d) are front perspective, top, left end, and front views, respectively, of one of the transducer assemblies shown in FIG. 2.
Figure 4D:
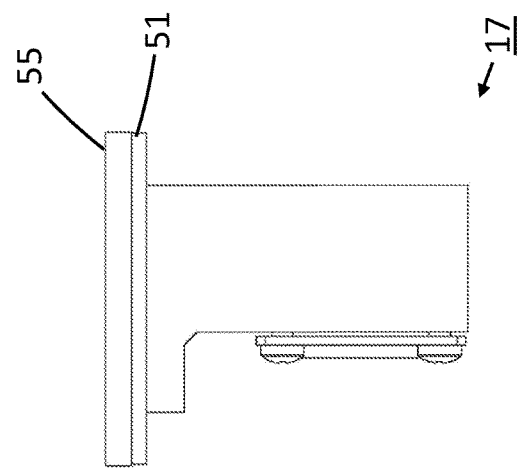
Figure 4B:
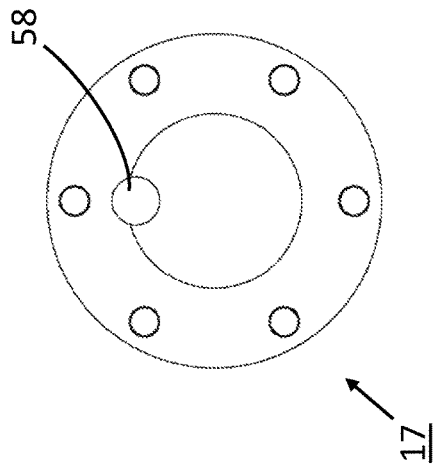
Figure 4C:
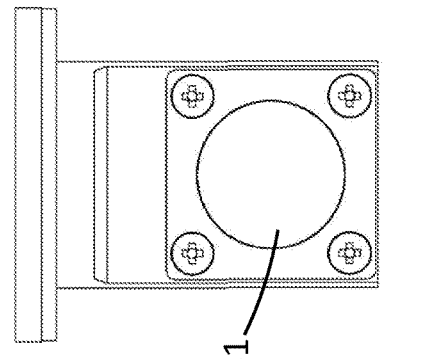

As seen most clearly in FIG. 3, a centrally-located, annular neck 35 projects radially outward from the top, exterior surface of main body 23. Neck 35 is shaped to define an interior cavity 37 which is dimensioned to receive sensors 19 and 21. A first pair of horizontally-disposed wire receptacles 39 extend between interior cavity 37 and top end 29-1 of bores 29. Further, a second pair of vertically-disposed wire receptacles 40 extend along the outer portion of each support 27 in communication between top end 29-1 and bottom end 29-2. Together, receptacles 39 and 40 enable wiring (not shown) from each of transducer assemblies 17 to be internally connected to an integrator (not shown) mounted on the distal end of neck 35. As a result, the transducer wiring is effectively protected from moisture or other environmental elements which may otherwise compromise its operability.

As referenced briefly above, each transducer assembly 17 is independently mounted at one open end of a corresponding mount 27. By independently mounting four separate transducer assemblies 17 at various locations within supports 27, the degree of fluid flow disruption within internal passageway 15 is minimized, as seen most clearly in FIG. 1(c).

Referring now to FIGS. 4(a)-(d) and 5, each transducer assembly 17 comprises (i) a transducer 41, (ii) a transducer mount, or stud, 43 dimensioned to receive transducer 41, (iii) a transducer gasket 45 disposed between transducer 41 and stud 43, (iv) a sensor plate 47 and screws 49 for retaining transducer 41 in place within stud 43, and (v) a mount gasket 51 for creating a seal between stud 43 and flow cell 13. Due to the minimal size, or footprint, of each assembly 17, fluid flow disruption is significantly lessened as compared to conventional flow meters, which is highly desirable.

Transducer 41 represents any device capable of sending and/or receiving electromagnetic radiation, such as sound waves. In the present example, transducer 41 is represented as an ultrasonic transducer. However, it is to be understood that transducer 41 could take alternative forms without departing from the spirit of the present invention.

Transducer stud 43 is a unitary, minimally-sized member that includes a block-shaped base 53 and an enlarged, disc-shaped flange 55 integrally formed on the top of base 53. As will be explained further below, transducer stud 43 supports transducer 41 and is adapted to be fixedly secured onto a shelf 31 in mount 27 during assembly.

Figure 5:
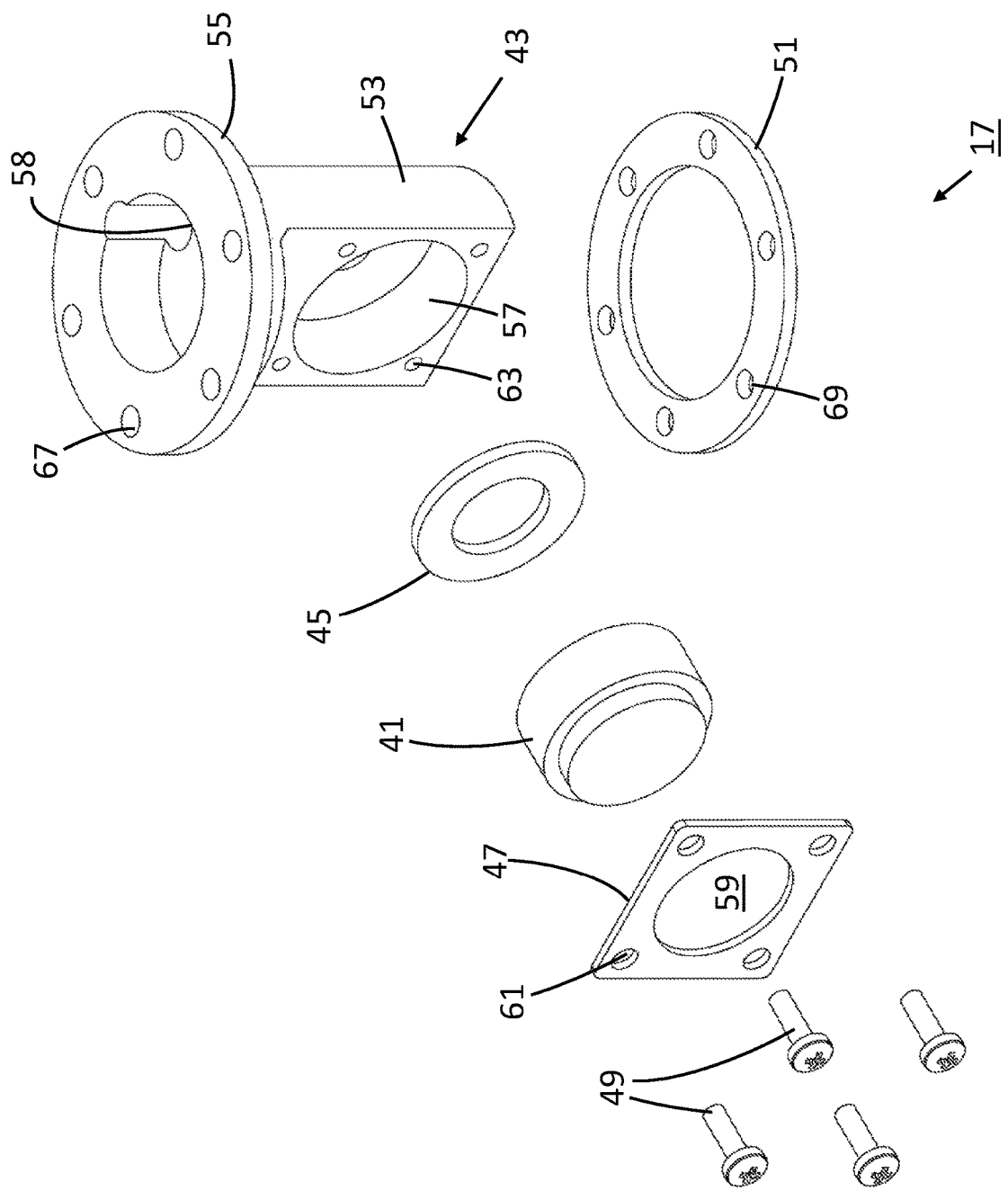
FIG. 5 is an exploded, front perspective view of the transducer assembly shown in FIG. 4(a).

As seen most clearly in FIG. 5, a circular recess 57 is formed in the front surface of base 53 and is dimensioned to fittingly receive transducer 41. Additionally, a vertical bore 58, generally circular in transverse cross-section, extends downward from the enclosed top surface of base 53 and terminates into recess 57. In this manner, wiring (not shown) connected to transducer 41 can be fed vertically upward through bore 58 and ultimately into connection with the integrator for meter 11.

As previously referenced and shown in FIG. 3, vertically-extending wire receptacles 40 are formed in each support 27 in communication between top end 29-1 and bottom end 29-2. Accordingly, wiring (not shown) for a lower transducer assembly (e.g. assembly 17-2) is adapted to be fed upward through its corresponding vertically-extending receptacle 40, then radially inward through its corresponding horizontally-extending receptacle 39, and, in turn, into connection with an integrator mounted on neck 35. In this capacity, wiring for each transducer 41 can be retained entirely within flow cell 13 in order to connect with an integrator mounted on neck 35.

Referring back to FIG. 5, as part of the assembly of each transducer assembly 17, transducer 41 is mounted within recess 57 with gasket 45 disposed between transducer 41 and base 53. Thereafter, sensor plate 47 is disposed flush against base 53 such that transducer 41 aligns within a central window, or opening, 59 formed in plate 47. Thereafter, each screw 49 is driven through a corresponding hole 61 formed in a corner of plate 47 and, in turn, into threaded engagement with screw holes 63 formed in base 53. In this manner, plate 47 and screws 49 serve to retain transducer 41 in place within stud 43.

Figure 2:
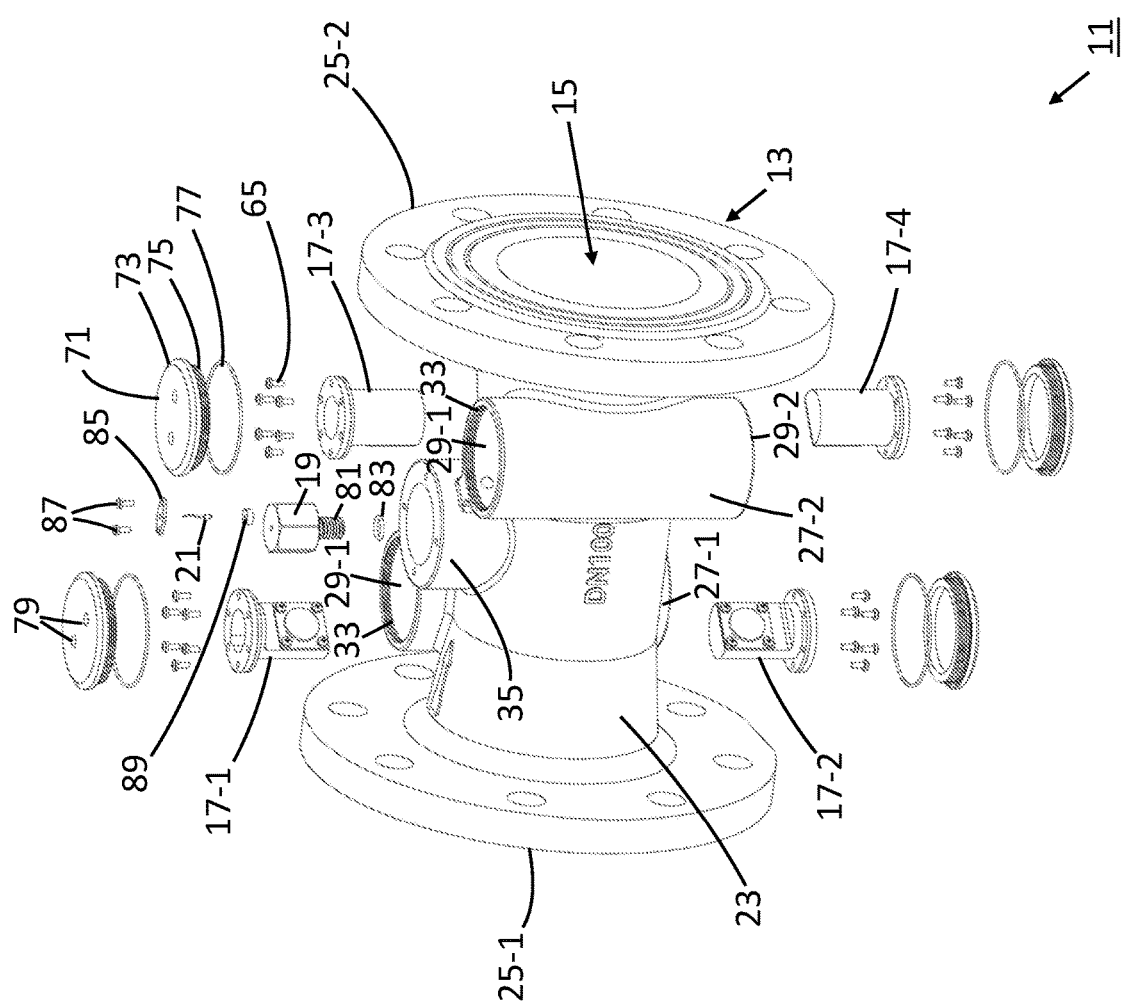
FIG. 2 is an exploded, front perspective view of the ultrasonic flow meter shown in FIG. 1(a)

With transducer mounted 41 mounted therein, gasket 51 is slid axially upward over the bottom portion of base 53 and into direct abutment against the underside of flange 55. Thereafter, stud 43 is axially inserted into a corresponding mount 27, as shown in FIG. 2. More specifically, one stud 43, with a transducer 41 mounted therein, is inserted downward through open top end 29-1 of each bore 29 and another stud 43, with a transducer 41 mounted therein, is inserted upward through open bottom end 29-2 of each bore 29.

As seen in FIG. 3, each stud 43 is inserted into a corresponding bore 29 such that gasket 51 lies flush against a corresponding shelf 31. Thereafter, screws 65 are then driven through a series of preformed holes 67 in flange 55, through a series of preformed holes 69 in gasket 51, and into threaded engagement with holes formed in shelf 31. As such, screws 65 retain transducer assembly 17 in place within flow cell 13.

As seen most clearly in FIGS. 2 and 3, a cap 71 is mounted on each end of mount 27 so as to selectively enclose bore 29. Cap 71 includes a button-shaped base 73 and an externally threaded stem 75 projecting orthogonally out from the inner surface of base 73. With an O-ring 77 axially mounted on each stem 75, cap 71 is driven into threaded engagement with internal threading 33 within bore 29. A pair of holes 79 is formed in the outer surface of base 73 so as to facilitate rotation of cap 71 (e.g. using a wrench or other similar tool).

As noted briefly above, sensors 19 and 21 are mounted within interior cavity 37 in neck 35 in order to compile pressure and temperature data, respectively, within flow cell 13. Specifically, pressure sensor 19 includes an externally threaded stem 81 which engages within a vertical bore formed main body 23 and projects into communication with internal passageway 15. An O-ring 83 axially mounts on stem 81 and creates a water-tight seal against main body 23.

Temperature sensor 21 is fixedly connected to a mounting pad, or plate, 85 which, in turn, is secured to flow cell 13 within interior cavity 37 by screws 87. A sealant ring 89 is preferably disposed between sensor 21 and flow cell 13 to create an adequate seal.

Referring now to FIG. 3, with flow meter 11 assembled in the manner set forth above, an integrator (not shown) preferably simultaneously initiates the transmission of (i) a first set of ultrasonic sound waves between upper transducer assemblies 17-1 and 17-3 (i.e. along an upper travel path A) and (ii) a second set of ultrasonic sound waves between lower transducer assemblies 17-2 and 17-4 (i.e. along a lower travel path B).

In addition to measuring the average time required for sound waves to complete a travel cycle between transducer assemblies 17, the integrator additionally compiles pressure and temperature data from sensors 19 and 21, respectively. Using the compiled information, the integrator is programmed to process the data and in order to calculate fluid flow rate and/or volume with considerable accuracy.

PRINCIPAL FEATURES AND ADVANTAGES OF THE PRESENT INVENTION

As referenced above, flow meter 11 is designated with a number of notable design features which provide significant performance advantages over traditional flow meters. Most notably, flow meter 11 is configured with four, independently-mounted transducer assemblies 17 which together provide flow meter 11 with a number of advantages over conventional flow meters.

Figure 1C:
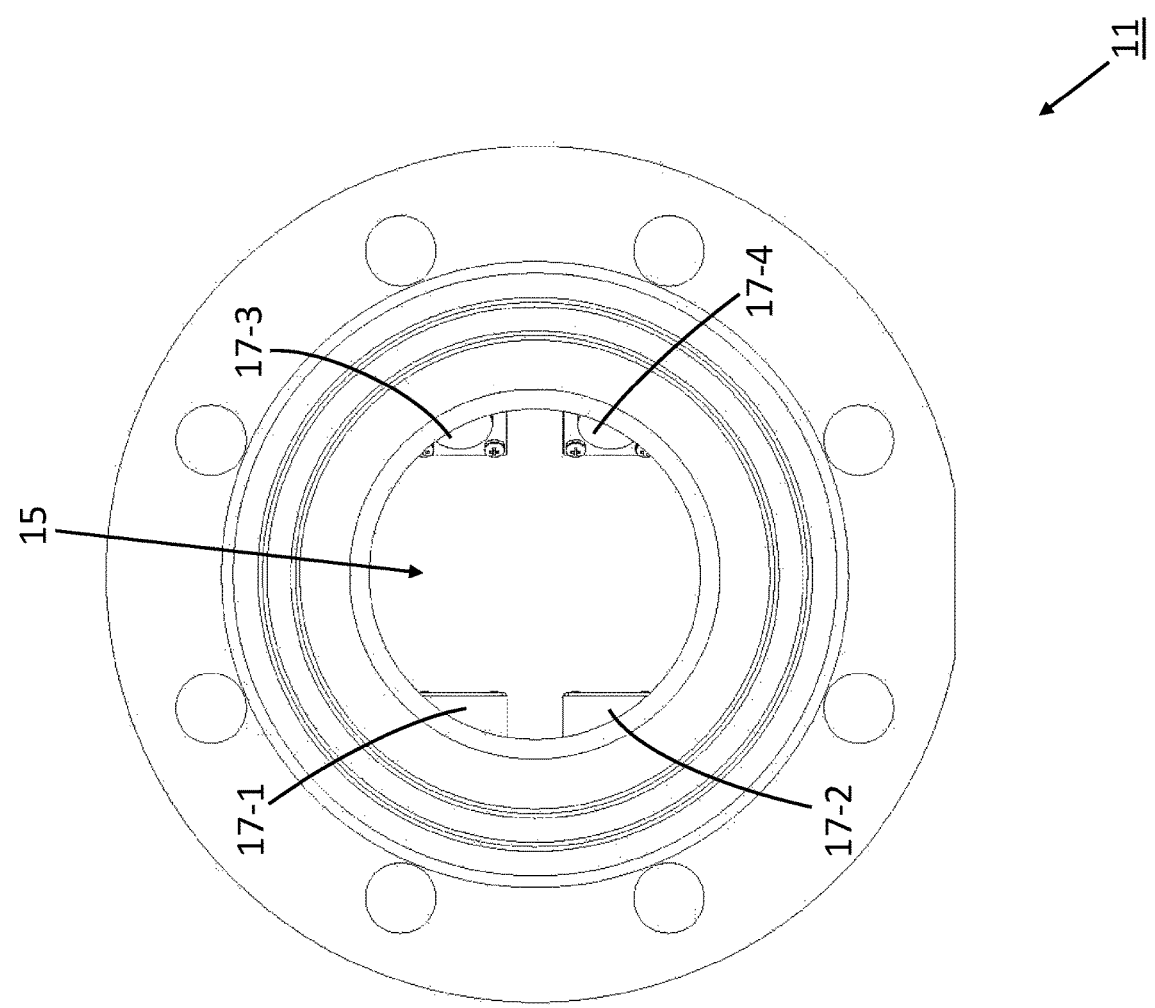

As a first advantage, the utilization of four separate transducer assemblies 17 minimizes the surface area of protuberances projecting into internal passageway 15, as shown in FIG. 1(c). As a consequence, less turbulence is created as a result of transducer assemblies 17, thereby improving the overall accuracy of all fluid flow rate and volume calculations.

As a second advantage, the utilization of four separate transducer assemblies 17 significantly reduces the length and size of the studs on which the individual transducers are mounted. This reduction in material lowers manufacturing costs.

As a third advantage, the utilization of four separate transducer assemblies 17 allows for greater flexibility of use, as the present design accommodates installation of transducer assemblies 17 within a greater range of flow cell sizes. In other words, transducer assemblies 17 of a particular size and shape may often be utilized even if the length of each mount 27 is varied to accommodate different flow cell sizes.

What is claimed is:
1. A flow meter, comprising:
 (a) a flow cell shaped to define an internal passageway, the flow cell comprising,
   (i) a tubular main body having first and second ends, and
   (ii) a pair of flanges, one of the pair of flanges being formed at each of the first and second ends of the main body, and
   (iii) a pair of hollow, cylindrical mounts formed at opposite ends at opposite ends of the main body, each of the pair of mounts being in fluid communication with the internal passageway, each of the pair of mounts defining a longitudinal bore with an open top end and an open bottom end,
   (iv) wherein the main body and the pair of flanges define the internal passageway of the flow cell; and
 (b) at least four separate transducer assemblies independently mounted within the flow cell in fluid communication with the internal passageway, wherein, with the flow meter in its assembled state, one of the at least four separate transducer assemblies is mounted in the open top end and another of the at least four separate transducer assemblies is mounted in the open bottom end of each of the pair of mounts, each of the at least four transducer assemblies, comprising,

(i) a transducer, and (ii) a transducer stud shaped to define a recess which is dimensioned to receive the transducer, the transducer stud comprising, (A) a base having a front surface and an enclosed top surface, wherein the front surface is shaped to define the recess dimensioned to receive the transducer, (B) an enlarged, annular flange formed on the top surface of the base, the flange having an underside;

(C) wherein a vertical bore extends downward from the top surface of the base and terminates into the recess.

2. The flow meter as claimed in claim 1 further comprising a pressure sensor mounted within the flow cell in fluid communication with the internal passageway.

3. The flow meter as claimed in claim 2 further comprising a temperature sensor mounted within the flow cell in fluid communication with the internal passageway.

4. The flow meter as claimed in claim 1 wherein the main body is shaped to define at least one enclosed wire receptacle in communication with the longitudinal bore in each of the pair of mounts.

5. The flow meter as claimed in claim 1 wherein each of the at least four transducer assemblies further comprises a sensor plate mounted on the transducer stud for retaining the transducer in the recess.

6. The flow meter as claimed in claim 5 wherein the sensor plate is shaped to define a window within which at least a portion of the transducer aligns when each of the at least four transducer assemblies is in its assembled state.

7. The flow meter as claimed in claim 6 wherein each of the at least four transducer assemblies further comprises a transducer gasket disposed between the transducer and the transducer stud.

8. The flow meter as claimed in claim 1 wherein each of the at least four transducer assemblies further comprises a mount gasket dimensioned for axial mounting over the base and in contact against the underside of the flange.

9. The flow meter as claimed in claim 8 wherein the open top end and the open bottom end for each of the pair of mounts is counterbored so as to create an internal shelf on which one of the at least four transducer assemblies is mounted.

10. The flow meter as claimed claim 9 wherein, with the flow meter in its assembled state, the flange formed on the base for each of the at least four transducer assemblies lies flush against a corresponding internal shelf in one of the pair of mounts.

* * * * *

UNITED STATES PATENT AND TRADEMARK OFFICE
CERTIFICATE OF CORRECTION

| | | |
|---|---|---|
| PATENT NO. | : 11,566,928 B2 | Page 1 of 1 |
| APPLICATION NO. | : 16/994562 | |
| DATED | : January 31, 2023 | |
| INVENTOR(S) | : Tianshui Liu et al. | |

It is certified that error appears in the above-identified patent and that said Letters Patent is hereby corrected as shown below:

On the Title Page

Inventors item (72), Line 2, please delete "Murad" and insert --Mourad--

Signed and Sealed this
Fourteenth Day of October, 2025

John A. Squires
*Director of the United States Patent and Trademark Office*